(12) United States Patent
Nakamura et al.

(10) Patent No.: US 9,706,781 B2
(45) Date of Patent: Jul. 18, 2017

(54) STUFFING APPARATUS

(71) Applicant: HITEC Co., Ltd., Kanagawa (JP)

(72) Inventors: Shinjiro Nakamura, Kanagawa (JP); Tatsuo Nakamura, Kanagawa (JP); Katsuya Tanabe, Kanagawa (JP)

(73) Assignee: HITEC Co., Ltd., Kanagawa (JP)

( * ) Notice: Subject to any disclaimer, the term of this patent is extended or adjusted under 35 U.S.C. 154(b) by 402 days.

(21) Appl. No.: 14/262,145

(22) Filed: Apr. 25, 2014

(65) Prior Publication Data

US 2014/0323023 A1 Oct. 30, 2014

(30) Foreign Application Priority Data

Apr. 26, 2013 (JP) ................. 2013-094170

(51) Int. Cl.
*A22C 11/02* (2006.01)

(52) U.S. Cl.
CPC .......... *A22C 11/0209* (2013.01); *A22C 11/02* (2013.01)

(58) Field of Classification Search
CPC ... A22C 11/00; A22C 11/001; A22C 11/0209; A22C 11/0245
USPC ........................ 452/30–32, 35–37, 46–48, 51
See application file for complete search history.

(56) References Cited

U.S. PATENT DOCUMENTS

| | | |
|---|---|---|
| 4,370,779 A | 2/1983 | Meier |
| 4,417,368 A | 11/1983 | Washburn |
| 4,823,439 A | 4/1989 | Schnell |
| 5,049,108 A | 9/1991 | Staudenrausch |
| 5,083,970 A | 1/1992 | Reutter |
| 5,102,314 A | 4/1992 | Staudenrausch |
| 6,514,134 B1 * | 2/2003 | Krompholz .......... A22C 11/107 452/30 |
| 6,666,759 B2 * | 12/2003 | Narciso ................ A22C 11/006 452/29 |
| 6,855,046 B2 * | 2/2005 | Cate ....................... A22C 11/00 452/30 |
| 7,220,176 B2 * | 5/2007 | Hartwick ................. A22C 7/00 452/30 |
| 7,381,122 B2 * | 6/2008 | Lagares Corominas ........... A22C 11/00 452/30 |
| 8,157,623 B2 * | 4/2012 | Weller ............... A22C 11/0227 452/32 |

(Continued)

FOREIGN PATENT DOCUMENTS

| | | | |
|---|---|---|---|
| JP | 5873508 A | 5/1983 | |
| JP | 6333206 A | 2/1988 | |

(Continued)

*Primary Examiner* — Richard Price, Jr.
(74) *Attorney, Agent, or Firm* — Bachman & LaPointe, PC

(57) ABSTRACT

A stuffing apparatus includes a main body case, a stuffing nozzle for discharging a material, a material feed pump for feeding the material into the stuffing nozzle, a pump drive motor for driving the material feed pump, and a conveying device for conveying a stuffed casing in a direction in which the material discharged is discharged, wherein a hopper into which the material is charged from above is provided above the material feed pump, the material feed pump, the pump drive motor, and the hopper are provided on the main body case on which the stuffing nozzle and the conveying device are provided, and the material which is fed from the material feed pump is automatically stuffed by being fed into the stuffing nozzle via a material feed pipe.

10 Claims, 14 Drawing Sheets

(56) References Cited

U.S. PATENT DOCUMENTS 8,678,885 B2 * 3/2014 Staudenrausch ....... A22C 11/08
  452/31
8,827,774 B2 * 9/2014 Bilowski .............. A22C 11/008
  452/35

FOREIGN PATENT DOCUMENTS

| JP | 2268638 A | 11/1990 |
| JP | 3189391 A | 8/1991 |
| JP | 05-236863 A | 9/1993 |
| JP | 05-344835 A | 12/1993 |
| JP | 08-118288 A | 5/1996 |
| JP | 2004520077 A | 7/2004 |
| WO | 02091838 A1 | 11/2002 |

* cited by examiner

DIAGRAM IMMEDIATELY AFTER SETTING AN EMPTY CASING IN THE CASING FEEDING DEVICE

DURING MANUAL STUFFING

STUFFING APPARATUS

BACKGROUND OF THE INVENTION

Field of the Invention

The present invention relates to a stuffing apparatus for manufacturing sausages or the like.

Description of the Related Art

Sausage products are manufactured by automatically or manually stuffing a material such as meat, i.e., a stuffing material, into an artificial casing such as a cellulose casing or a collagen casing, or a casing of an animal intestine such as a sheep intestine or a pig intestine.

A conventional stuffing apparatus is shown in FIG. 13 (front elevational view) and FIG. 14 (plan view). A stuffing apparatus 1 includes a box-shaped, substantially rectangular main body case 2 and a similarly box-shaped, substantially rectangular pump case 10 formed as a unit separate from the main body case 2, and the following, among others, are arranged on the main body case 2: a stuffing nozzle 4 for stuffing a material such as meat, i.e., a stuffing material, into an empty casing (not shown); a casing feeding device 5 for automatically loading the empty casing on the stuffing nozzle 4; a stuffing nozzle rotating means 6 for rotating the stuffing nozzle 4; a braking mechanism 7 which engages the outer periphery of the empty casing and presses the empty casing in a direction toward the outer peripheral surface of the stuffing nozzle 4; a pincher device 8 which is a conveying device for feeding the stuffed casing with the material stuffed therein forwardly (in a direction away from the stuffing nozzle 4) and squeezing it; and a metering pump 9 for metering and feeding the material into the stuffing nozzle 4.

Mounted on the pump casing 10 are, among others, a conical hopper 11 into which the material is charged from above, a lift arm 12 for charging the material into the hopper 11, a material feed pump 13 (disposed underneath the bottom portion of the hopper 11 and indicated by broken lines) which is provided underneath the hopper 11 and has a pump chamber and vanes which are not shown; and a pump drive motor 14 for driving the material feed pump 13.

The material feed pump 13 and the metering pump 9 are connected by a material feed pipe 15; a predetermined amount of the material is continuously fed from the material feed pump 13 to the stuffing nozzle 4 via the metering pump 9; while the shrunk empty casing loaded on the outer periphery of the stuffing nozzle 4 by the casing feeding device 5 is being rotated together with the stuffing nozzle 4 and the braking mechanism 7, the material in the stuffing nozzle 4 is stuffed into the empty casing which is pulled out and extended forwardly; the stuffed casing with the material stuffed therein is constricted by the pincher device 8, and a twist is formed at that constricted portion by the rotation of the stuffing nozzle 4 and the braking mechanism 7, to thereby manufacture sausage products or the like having a predetermined length.

As described above, the conventional stuffing apparatus 1 is constructed such that stuffing nozzle 4, the casing feeding device 5, the stuffing nozzle rotating means 6, the braking mechanism 7, the pincher device 8, the metering pump 9, and the like are provided on the main body case 2, the hopper 11, the material feed pump 13, the pump drive motor 14, and the like are provided on the pump case 10, i.e., a unit separate from the main body case 2, and the material feed pump 13 and the metering pump 9 are connected by the material feed pipe 15 having a long length. Further, in the case where the pump case 10 is situated on the side of the main body case 2, the length from one end portion of the main body case 2 to the distal end of the lift arm 12 becomes 3590 mm. Stuffing apparatuses in which the main body case 2 and the pump case 10 are formed as separate units are known in JP-A-1983-73508 and WO/2004-520077.

Incidentally, the provision of the main body case 2 and the pump case 10 as separate units entails that the pump case 10 is required separately, which results in a higher product cost by that margin and requires an extra space for installing the pump case 10.

In addition, since the length of the material feed pipe 15 connecting the material feed pump 13 and the metering pump 9 becomes long, the meat quality of the material undergoes a change in quality in the course of feeding the material, a decrease in the amount of material meat fed occurs due to a drop in the pressure of meat fed through the material feed pipe 15, and the amount of material remaining in the material feed pipe 15 after completion of the stuffing operation becomes large, resulting in the waste of the material by that margin.

In addition, since the floor surface of the worksite where the stuffing apparatus 1 is installed has inclination and unevenness, a difference in height from the floor surface is likely to occur between the metering pump 9 mounted on the main body case 2 and the material feed pump 13 mounted on the pump case 10. If the height difference is present, the material feed pipe 15 becomes difficult to be connected to the metering pump 9 and the material feed pump 13, and the operation of detaching and attaching the material feed pipe 15 at the time of the daily cleaning of the stuffing apparatus 1 becomes time-consuming.

In addition, since the material feed pipe 15 needs to be detached and cleaned, if the length of the material feed pipe 15 is long, the material feedpipe 15 becomes correspondingly heavy, the detachment and reassembly after cleaning are made difficult, and the cleaning is made time-consuming and troublesome.

Further, since a display unit 16 having various switches 16a and a display 16b for driving the material feed pump 13 is provided on the pump case 10 which is disposed at a position distant from the main body case 2, an operator S needs to move to that position to press the switches 16a and confirm the display 16b, so that the time and trouble of the operator S increases and the operating efficiency deteriorates correspondingly. It should be noted that a display unit 17 having various switches 17a and a display 17b concerning the various devices provided on the main body case 2 is provided on the main body case 2.

In addition, a vacuum pump 18 for setting the pressure within the pump chamber of the material feed pump 13 to a low level to facilitate the flow of the material and a trap 19 for trapping a portion of the material, which is sucked together with the air when the pressure within the pump chamber is set to a low level by the vacuum pump 18, are provided in the pump case 10. The material which is trapped by this trap 19 needs to be removed by the operator S. However, since the trap 19 is provided in the pump case 10 disposed at the position distant from the main body case 2, the operator S is necessitated to move to that position to remove the trapped material from the trap 19, so that, likewise, the time and trouble of the operator S increases and the operating efficiency deteriorates correspondingly.

Furthermore, conventional stuffing apparatuses for automatic stuffing are designed for exclusive use for automatic stuffing, and consideration is not given to manual stuffing. Therefore, in the case of performing manual stuffing, an exclusive apparatus needs to be prepared separately, which results in higher production cost by that margin.

SUMMARY OF THE INVENTION

In view of the above-described circumstances, it is an object of the present invention to provide a stuffing apparatus which is compact, inexpensive, and highly convenient by providing the material feed pump, the pump drive motor, the hopper, and the like in or on the main body case having the stuffing nozzle and the like, thereby overcoming the drawbacks of the conventional art.

In accordance with a first aspect of the present invention, there is provided a stuffing apparatus comprising: a main body case, a stuffing nozzle having a discharge port for discharging a material, a material feed pump for feeding the material into the stuffing nozzle, a pump drive motor, and a conveying device for conveying a stuffed casing with the material stuffed therein in a direction in which the material discharged from the discharge port is discharged, wherein a hopper into which the material is charged from above is provided above the material feed pump, the material feed pump, the pump drive motor, and the hopper are provided on the main body case on which the stuffing nozzle and the conveying device are provided, and the material which is fed from the material feed pump is automatically stuffed by being fed into the stuffing nozzle via a material feed pipe.

In accordance with a second aspect of the invention, in the stuffing apparatus according to the first aspect of the invention, the hopper has a conical shape or a polygonal pyramid shape, a lower opening communicating with a pump chamber of the material feed pump is provided in a bottom member of the hopper, and the lower opening is positioned at an upper surface of the main body case in a plan view. The term "plan view" is construed to mean viewing from above.

In accordance with a third aspect of the invention, in the stuffing apparatus according to the first or second aspect of the invention, the stuffing nozzle is coupled to a cylinder rod of a stuffing nozzle-use air cylinder via a coupling member, and in an initial position of the stuffing nozzle, the coupling member is positioned in an area of a large-diameter end of the hopper in a plan view.

In accordance with a fourth aspect of the invention, the stuffing apparatus according to any one of the first to third aspects of the invention further comprises: a vacuum pump for setting the pressure within the pump chamber of the material feed pump to a low level; and a trap provided in a coupling pipe for coupling the pump chamber and the vacuum pump to trap the material which is sucked, the trap being provided on aside surface, located on a side of an operator, of the main body case.

In accordance with a fifth aspect of the invention, in the stuffing apparatus according to any one of the first to fourth aspects of the invention, the material feed pipe is detachable with respect to a material feed port of the material feed pump, and, during manual operation, manual stuffing is effected after removing the material feed pipe and mounting a manual stuffing nozzle to the material feed port.

In accordance with a sixth aspect of the invention, in the stuffing apparatus according to the fifth aspect of the invention, the stuffing nozzle and the manual stuffing nozzle are parallel with each other in a plan view.

In accordance with a seventh aspect of the invention, in the stuffing apparatus according to the fifth or sixth aspect of the invention, operating positions of the operator at the time of automatic stuffing using the stuffing nozzle and manual stuffing using the manual stuffing nozzle are on opposite sides with the main body case interposed therebetween.

In accordance with an eighth aspect of the invention, the stuffing apparatus according to any one of the first to seventh aspects of the invention further comprises: a display unit for displaying an operating condition, the display unit being rotatable on the main body case.

In accordance with a ninth aspect of the invention, the stuffing apparatus according to the first aspect of the invention further comprises: a casing feeding device disposed at a position adjacent to, and on a forward side of, the material feed pipe to set a shirred casing in alignment with an axis of the stuffing nozzle.

According to the present invention, the material feed pump, the pump drive motor, and the hopper are integrally built into or on the main body case on which the stuffing nozzle and the conveying device are provided; more specifically, the lower opening at the bottom portion of the hopper, communicating with the pump chamber, is positioned at the upper surface of the main body case in a plan view, thereby making it possible to prevent the main body case from becoming large in size and the product cost from becoming high, and making it possible to reduce the installation space.

In addition, the operator's operation of removing the material from the trap can be facilitated by providing the trap on the side surface, located on the operator's side, of the main body case.

In addition, the handling operation of the material feed pump and the like can be facilitated by making rotatable the display unit having switches.

In addition, by adopting a hybrid system which permits automatic stuffing and manual stuffing over the main body case, it is possible to enhance the functions and value of the stuffing apparatus and improve convenience.

Further, as the respective operating positions of the operator for operating the aforementioned hybrid-type stuffing apparatus are disposed on opposite sides with the main body case interposed therebetween, thereby facilitating the installation of a work table which is used during manual stuffing as well as the operation during manual stuffing.

Furthermore, as the stuffing nozzle and the manual stuffing nozzle are made parallel with each other in a plan view, it is possible to prevent an increase in the transverse length of the main body case.

Still further, as there are provided the material feed pipe having a short length which is capable of reducing a change in the quality of the material and the casing feeding device which makes a shirred casing to be automatically loaded on the stuffing nozzle, it is possible to manufacture high-quality sausages by a more automated apparatus.

DETAILED DESCRIPTION OF THE PREFERRED EMBODIMENTS

Figure 1:
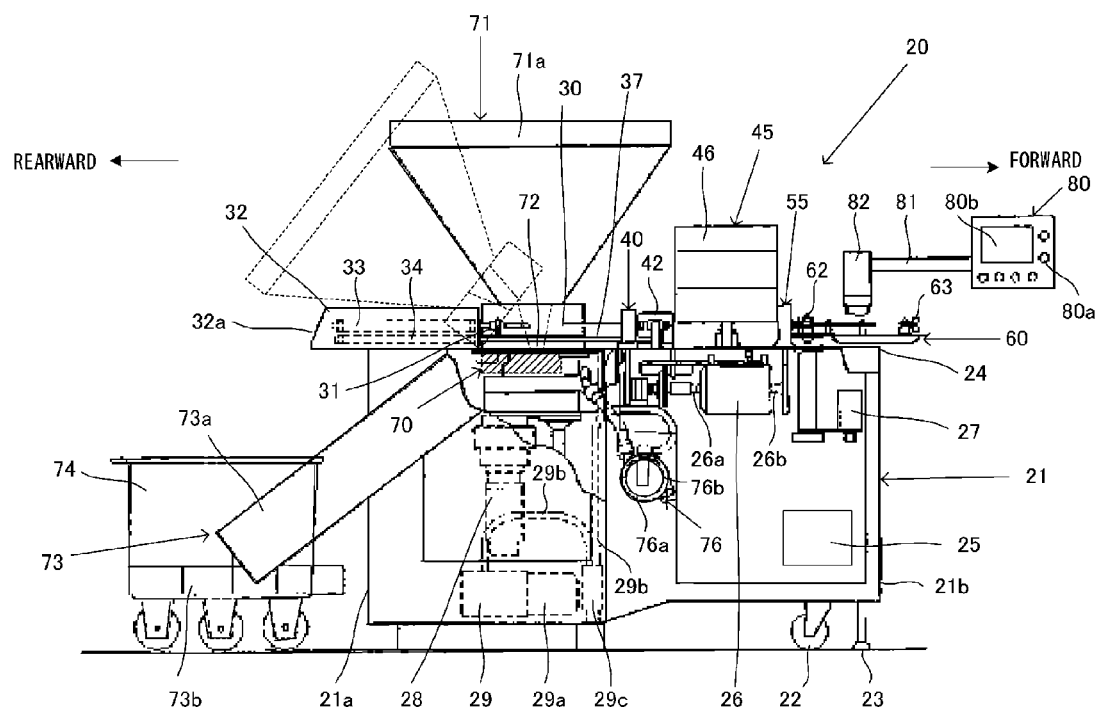
FIG. 1 is a front elevational view of a stuffing apparatus in accordance with an embodiment of the present invention.

Hereafter, a detailed description will be given of an embodiment of the present invention with reference to the accompanying drawings. It should be noted that it is assumed that, in FIG. 2, the side of a cylinder accommodating box 32 is a rearward side, the side of a pincher device 60 is a forward side, the direction from the cylinder accommodating box 32 toward the pincher device 60 is a longitudinal direction (the direction of the long side of the main body case and the left-right direction in the plane of the drawing), the direction perpendicular to that longitudinal direction is a transverse direction (the direction of the short side of the main body case and the vertical direction in the plane of the drawing), the lower side in the plane of the drawing is a near side (the side where an operator S is located), and the upper side therein is a far side (the side away from the operator S).

A stuffing apparatus 20 has a box-shaped main body case 21 which has legs 22 and a stopper 23 at its bottom and is movable. An upper surface 24 of the main body case 21 (hereinafter simply referred to as the upper surface 24) has a substantially rectangular shape, and the following are arranged thereon from the rearward side toward the forward side: the cylinder accommodating box 32, a stuffing nozzle 30, a stuffing nozzle rotating device 40, a casing feeding device 45, a braking mechanism 55, and the pincher device 60 which is a conveying device, so as to automatically stuff the material.

In addition, a hopper 71, which serves as a material charging inlet, is arranged on the upper surface 24 on the far side of the stuffing nozzle 30, and a material feed pump 70 is arranged underneath the hopper 71.

A control box 25, a drive motor 26, a pincher-use drive motor 27, a pump drive motor 28, and a vacuum pump 29 are arranged inside the main body case 21.

The control box 25 has therein a controller having an arithmetic processing use, a memory, and the like to control the drive mechanism including the material feed pump 70, the stuffing nozzle 30, the braking mechanism 55, and the pincher device 60.

The drive motor 26 has drive shafts 26a and 26b on both ends thereof, and the drive shafts 26a and 26b are respectively coupled to the stuffing nozzle rotating device 40 and the braking mechanism 55 via a pulley and a belt to rotate the stuffing nozzle 30 and the braking mechanism 55 at respective predetermined numbers of revolutions which are set.

The pincher-use drive motor 27 is similarly coupled to the pincher device 60 via a pulley and a belt to rotate the pincher device 60 at a predetermined number of revolutions which is set.

The pump drive motor 28 is coupled to the material feed pump 70 via a gear to rotate the material feed pump 70 at a predetermined number of revolutions which is set.

The vacuum pump 29 is rotated by a vacuum pump drive motor 29a, which is directly connected to the vacuum pump 29, at a predetermined number of revolutions which is set.

A description will be given the respective members provided on the upper surface 24. The cylinder accommodating box 32 is a cross-sectionally rectangular, elongated box-shaped member which is provided in the longitudinal direction on the rearward side of the main body case 21, and a stuffing nozzle-use air cylinder 33 and a casing pushing-use air cylinder 34 are arranged inside the cylinder accommodating box 32.

In terms of their respective arranging positions, the stuffing nozzle-use air cylinder 33 and the casing pushing-use air cylinder 34 are both arranged in the longitudinal direction, the stuffing nozzle-use air cylinder 33 being disposed on an upper side and the casing pushing-use air cylinder 34 being disposed immediately therebelow. By adopting such an arrangement, the length in the transverse direction of the main body case 21 can be made short.

In addition, as shown in FIG. 1, as for the cylinder accommodating box 32, its rear end portion 32a projects toward the rearward side from a rearward end 21a of the main body case 21. By adopting such an arrangement, the length in the longitudinal direction of the main body case 21 can be made short.

The stuffing nozzle 30 is a straight round pipe member which is provided on the forward side of the cylinder accommodating box 32 in such a manner as to extend horizontally in the longitudinal direction. One end of the stuffing nozzle 30 is coupled to a cylinder rod 33a of the stuffing nozzle-use air cylinder 33 via a rotary joint 31 serving as a coupling member in accordance with the present invention. During stuffing, the stuffing nozzle-use air cylinder 33 together with the rotary joint 31 pushes the stuffing nozzle 30 toward the forward side, and upon completion of the stuffing of one casing, the stuffing nozzle-use air cylinder 33 together with the rotary joint 31 returns the stuffing nozzle 30 to an initial position on the rearward side, i.e., to the position shown in FIGS. 1 and 2. In the initial position of the stuffing nozzle 30, the rotary joint 31, which is the coupling member, is positioned within the area of a large-diameter end 71a of the hopper 71 in a plan view.

The stuffing nozzle 30 has a discharge port 30a (see FIG. 3) provided at its other end to feed the material, extruded from the material feed pump 70, into a forward end portion of a forward unshirred casing 35a of an empty shirred casing 35 which is loaded on the outer periphery of the stuffing nozzle 30.

A casing pusher 37 is coupled to the forward side of the casing pushing-use air cylinder 34. The casing pusher 37 is a member which is disposed immediately below the stuffing nozzle 30 in the longitudinal direction and has a push rod 37a and a push member 37b (see FIG. 3).

A rearward end of the push rod 37a is coupled to a forward end of the casing pushing-use air cylinder 34, and the push member 37b is coupled to a forward end of the push rod 37*a*. The push member 37*b* has at its distal end a fitting hole 37*bb* through which the outer periphery of the stuffing nozzle 30 is inserted.

At the time of stuffing the material into the shirred casing 35, the casing pusher 37 abuts against a rear end portion 35*b* of the shirred casing 35 to push the shirred casing 35 to the forward side by the action of the casing pushing-use air cylinder 34, thereby assisting to allow the material to be efficiently filled in all of one shirred casing 35.

An unillustrated detector for detecting the position of the casing pusher 37 is provided. When it is detected by the detector that the casing pusher 37 has moved forwardly a predetermined distance, it is determined that all of the one shirred casing 35 has been used, and the stuffing nozzle-use air cylinder 33 and the casing pushing-use air cylinder 34 are driven to move the stuffing nozzle 30 and the casing pusher 37 to the rearward side. Subsequently, the casing feeding device 45 is driven to set a new shirred casing 35 on an axis X-X (in the X-X direction in FIG. 3) of the retracted stuffing nozzle 30.

The stuffing nozzle rotating device 40 is a member which is provided on the forward side of the cylinder accommodating box 32 and has therein an unillustrated opening through which the stuffing nozzle 30 enters. The stuffing nozzle rotating device 40 is coupled to the drive shaft 26*a* of the aforementioned drive motor 26 via a pulley, a belt, and a clutch, such that when the stuffing nozzle 30 is pushed through the opening to the forward side up to a stuffing position by the stuffing nozzle-use air cylinder 33, the clutch is engaged and the stuffing nozzle rotating device 40 rotates the stuffing nozzle 30 at a predetermined number of revolutions which has been set.

Figure 10:
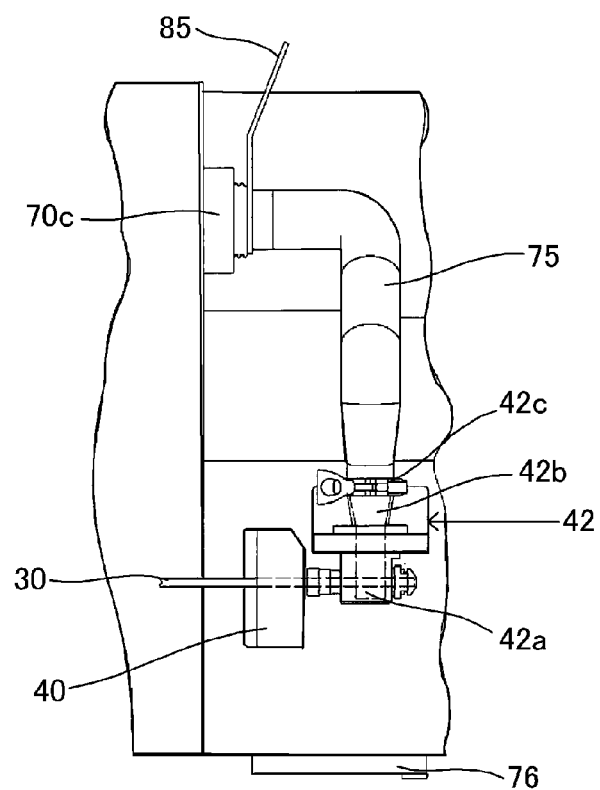
FIG. 10 is a plan view of a material feed pipe and its vicinities.

A nozzle supporting casing 42 for supporting the stuffing nozzle 30 is provided between the stuffing nozzle rotating device 40 and the casing feeding device 45 (see FIG. 10). This nozzle supporting casing 42 has an internal space 42*a*, and the stuffing nozzle 30 is passed through the internal space 42*a* and penetrates the same in the longitudinal direction.

In addition, the nozzle supporting casing 42 has a through hole 42*b* which is open from the far side toward the near side, and one end of a material feed pipe 75 is fitted to this through hole 42*b* and is fixed by a clamp 42*c*. When the stuffing nozzle 30 is moved to the stuffing position, an unillustrated opening provided in a side surface of the stuffing nozzle 30 is positioned in the internal space 42*a*, and the material which is sent via the material feed pipe 75 is fed into the stuffing nozzle 30 through this opening.

It should be noted that since the length of the material feed pipe 75 in accordance with the present invention is greatly shortened in comparison with those of conventional examples, it is possible to prevent the occurrence of the drawbacks that the meat quality of the material undergoes a change in quality in the course of feeding the material, a decrease in the amount of material meat fed occurs due to a drop of the meat feeding pressure in the material feed pipe 75, and the amount of material remaining in the material feed pipe 75 after completion of the stuffing operation becomes large, resulting in the waste of the material by that margin. Further, the detachment, reassembly, and cleaning of the material feed pipe are facilitated.

Namely, the material feed pipe 75 couples together a material feed port 70*c* of the material feed pump 70 and the nozzle supporting casing 42, and has a substantially L-shaped configuration. The stuffing apparatus 20 is configured such that the material feed pump 70 and the nozzle supporting casing 42 are both provided on the main body case 21 to maintain the positional relationship therebetween to be fixed. For this reason, even if the floor surface of the worksite of the stuffing apparatus 20 has inclination and unevenness, a difference in height and positional offset in the transverse direction do not occur. In consequence, the material feed pipe 75 can be easily attached to the material feed port 70*c* and the nozzle supporting casing 42, and the operation of detaching and attaching the material feed pipe 75 at the time of the daily cleaning of the stuffing apparatus 20 is completed in a short time.

As a lower opening 72 of the hopper 71 is located at the upper surface of the main body case 21, the stuffing apparatus 20 is configured such that the longitudinal distance from the material feed port 70*c* to the nozzle supporting casing 42 and the transverse distance from the material feed port 70*c* to the stuffing nozzle 30 are short, so that the overall length of the material feed pipe 75 which is bent in the substantially L-shaped configuration is short.

Figure 13:
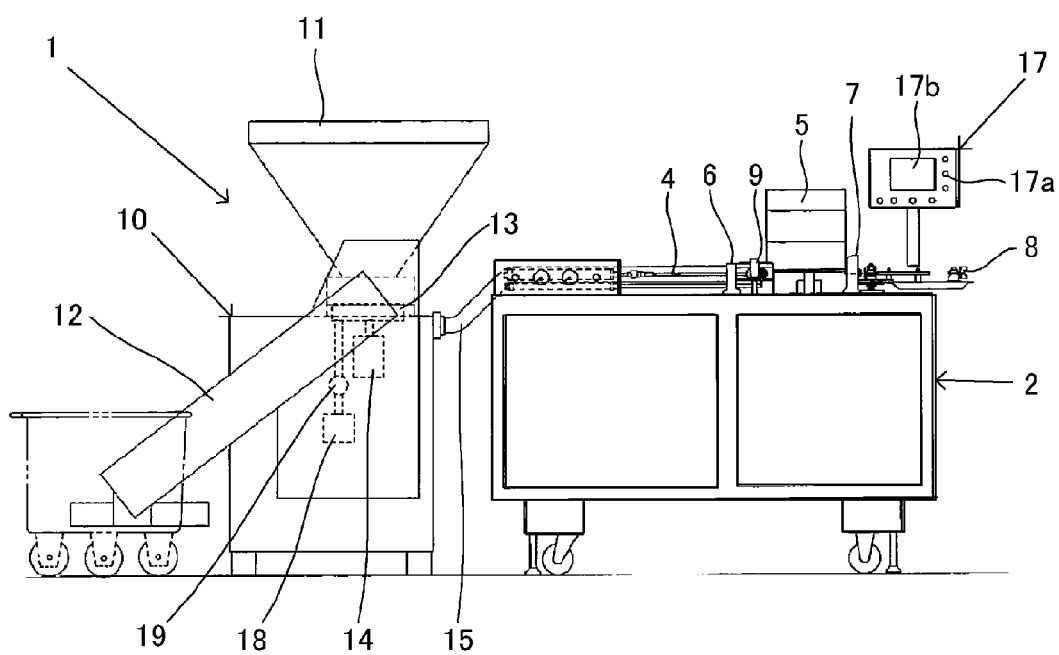
FIG. 13 is a front elevational view of a conventional stuffing apparatus.

Since the length of the material feed pipe 75 is short and a drop in the pressure of meat fed through the material feed pipe 75 is small, a required amount of material can be stuffed into the casing even if a metering pump 9 (shown in FIGS. 13 and 14) of a conventionally known gear pump type is not provided. In addition, since the metering pump 9 which can cause a change in the quality of the material is not provided, it is possible to manufacture high-quality sausages. However, the present invention of this application is also applicable to a stuffing apparatus having the metering pump 9. Furthermore, since the length of the material feed pipe 75 is short, it is possible to lessen the change in the quality of the material in the material feed pipe 75, and the amount of material remaining in the material feed pipe 75 after completion of the stuffing operation is small, reducing the waste of the material.

Figure 5:
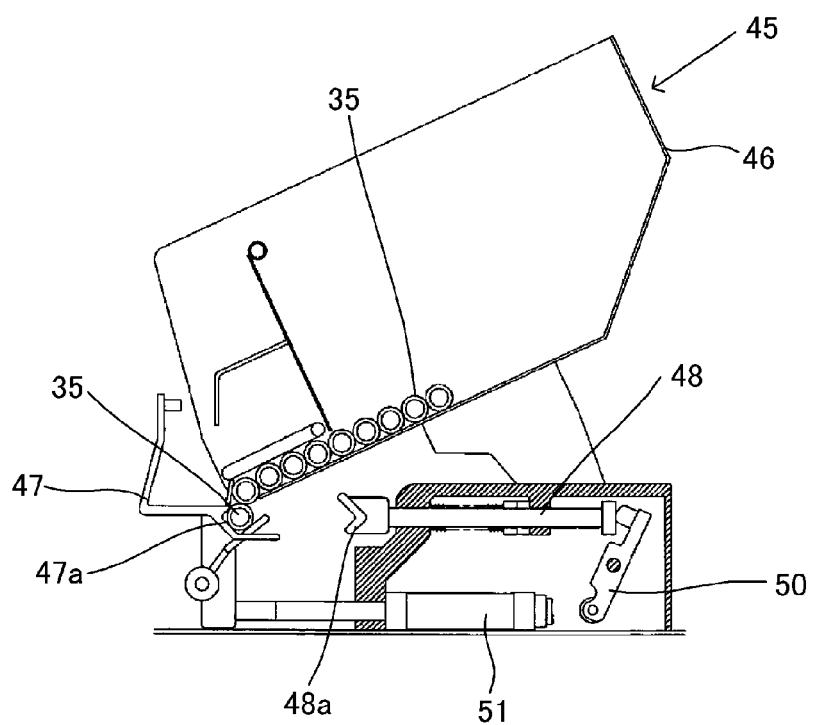
FIG. 5 is a diagram illustrating a state before an empty casing is set in the casing feeding device.
Figure 6:
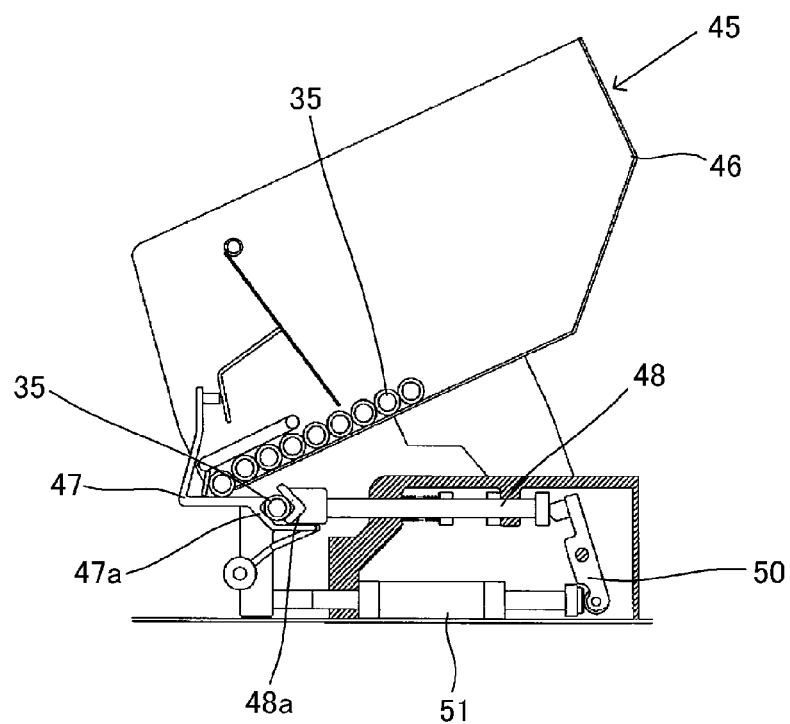
FIG. 6 is a diagram illustrating a state immediately after an empty casing has been set in the casing feeding device.

The casing feeding device 45 is provided on the forward side of the nozzle supporting casing 42 and allows the new shirred casing 35 to be automatically loaded on the outer periphery of the stuffing nozzle 30. An example of it is shown in FIGS. 5 and 6.

The casing feeding device 45 has a casing hopper 46, a first clamp 47, a second clamp 48, a pressing piece 50, and a clamp-use air cylinder 51.

The casing hopper 46 is an accommodating member which is inclined in such a manner as to descend from the far side toward the near side, and a plurality of empty shirred casings 35 are accommodated in its interior.

The first clamp 47 and the second clamp 48 have V-shaped heads 47*a* and 48*a* which are arranged in such a manner as to oppose each other in the transverse direction (left-right direction in the drawings) perpendicular to the axis X-X of the stuffing nozzle 30. The first clamp 47 is coupled to an end portion on the near side (left side in the drawings) of the clamp-use air cylinder 51, while an end portion on the far side (right side in the drawings) of the clamp-use air cylinder 51 opposes one end of the pressing piece 50 which swings like a seesaw at a fixed distance therefrom, and the other end of the pressing piece 50 abuts against a far-side end portion of the second clamp 48.

During stuffing, the clamp-use air cylinder 51 is at the position shown in FIG. 5, but when all of one shirred casing 35 being stuffed is used up, the stuffing nozzle 30 is retracted to the initial position between the casing feeding device 45 and the stuffing nozzle rotating device 40 along the axis X-X, as described above.

Subsequently, the clamp-use air cylinder 51 moves the first clamp 47 to the far side as shown by the arrow, and presses the one end of the pressing piece 50. Then, the other end of the pressing piece 50 pushes the second clamp 48 toward the near side as shown by the arrow. As a result, a lowermost one of the shirred casings 35 comes to be positioned at the position shown in FIG. 6 where it is pinched by the V-shaped heads 47a and 48a, i.e., on the axis X-X of the stuffing nozzle 30. The clamp-use air cylinder 51 after being set in the state shown in FIG. 6 returns to the state shown in FIG. 5.

Figure 3:
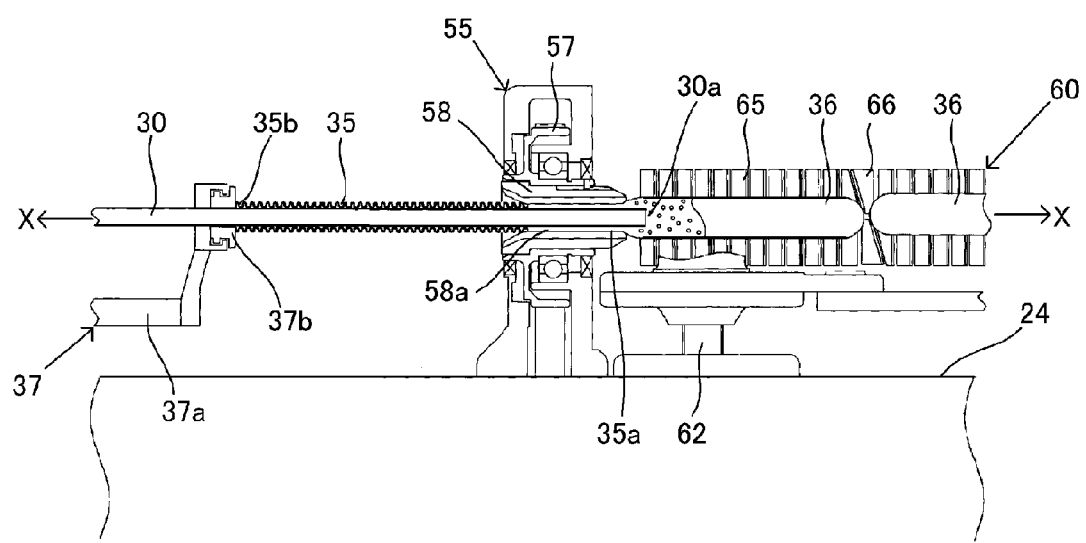
FIG. 3 is an enlarged front elevational view of a braking mechanism and its vicinities with a casing feeding device removed.
Figure 4:
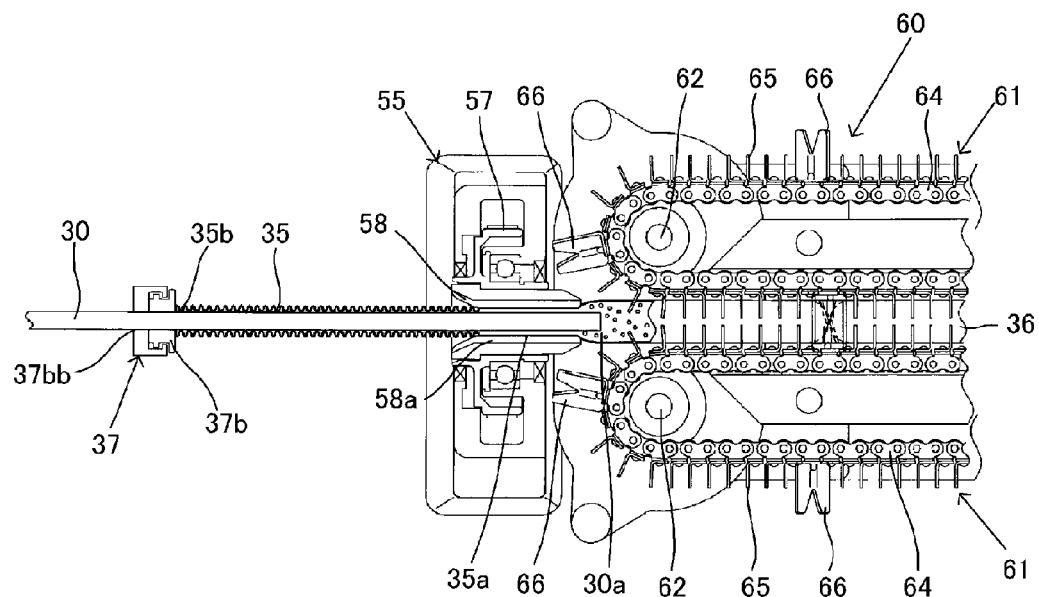
FIG. 4 is a plan view of the braking mechanism and its vicinities shown in FIG. 3.

The braking mechanism 55 is a member which together with the stuffing nozzle 30 rotates the unshirred casing 35a, and has a pulley 57 and a braking member 58, as shown in FIGS. 3 and 4.

The pulley 57 is rotatable, and is rotated by the aforementioned drive motor 26 via the drive shaft 26b. In addition, the braking member 58 is inserted in an opening of a central lower portion of the pulley 57 and corotates with the pulley 57.

The braking member 58 is a tubular member having a round lower opening at its center, and a plurality of axially extending rib-like projections 58a are formed on an inner peripheral surface of that lower opening in such a manner as to extend radially at equal intervals. The inside diameter of the lower opening of the plurality of rib-like projections 58a is set to be larger than the outside diameter of the stuffing nozzle 30, and the shirred casing 35 is pulled and stretched between the plurality of rib-like projections 58a and the outer periphery of the stuffing nozzle 30, and is thereby formed into the unshirred casing 35a.

The pincher device 60, which is a conveying device, constricts a stuffed casing 36 with the material stuffed therein and conveys it forwardly of the stuffing nozzle 30. As shown in FIG. 4, the pincher device 60 is constituted by arranging in parallel a pair of wrapping connector means 61, and each of the wrapping connector means 61 has a driving shaft 62, a driven shaft 63 (see FIG. 1), and a chain 64 wound around and trained between the driving shaft 62 and the driven shaft 63, and the chain 64 has a plurality of lugs 65 and a plurality of pincher members 66.

The lug 65 is a member which pinches the outer periphery of the stuffed casing 36, and the pincher member 66 is a cross-sectionally substantially V-shaped member for forming an end portion of the sausage link by constricting the stuffed casing 36 and for causing a twist at the end portion. In addition, the pincher device 60 is operated at a desired number of revolutions by the pincher-use drive motor 27 whose number of revolutions is variable.

When the pair of wrapping connector means 61 which are disposed in parallel are rotated, the plurality of lugs 65 of the respective wrapping connector means 6l advance to the forward side in the form of pinching the stuffed casing 36, the plurality of pincher members 66 of the respective wrapping connector means 61 constrict the stuffed casing 36 to form the end portions. As a consequence, a twist is formed at the constricted portion by the rotation of the stuffing nozzle 30 and the braking mechanism 55.

It should be noted that the pincher device 60 of the apparatus of this embodiment is one example of the conveying device for conveying the stuffed casing 36 in the direction in which the material discharged from the discharge port 30a of the stuffing nozzle 30 is discharged. The conveying device in accordance with the invention of this application is not limited to the above-described pincher device 60. For example, the conveying device may be configured so as not to form linked sausages as in the conveyor means 36 disclosed in JP-A-1983-73508, or may be a sausage link forming device in which a constricting member and a pair of conveying belts are formed as separate units as in the device disclosed in JP-A-1990-268638.

As described above, the hopper 71 is disposed on the upper surface 24, and the material feed pump 70 is disposed below the hopper 71.

The hopper 71 consists of a conical member 711 and a bottom member 712. The conical member 711 is in the form of a thin plate and has a large-diameter circular end 71a at its top. Further, the hopper 71 has a circular small-diameter end 71b beneath the conical member 711 and a circular flange 713 projecting outwardly from the circular small-diameter end 71b. It should be noted that the conical member 711 may have a polygonal pyramid-like shape, e.g., a quadrangular pyramid-like shape.

Figure 7:
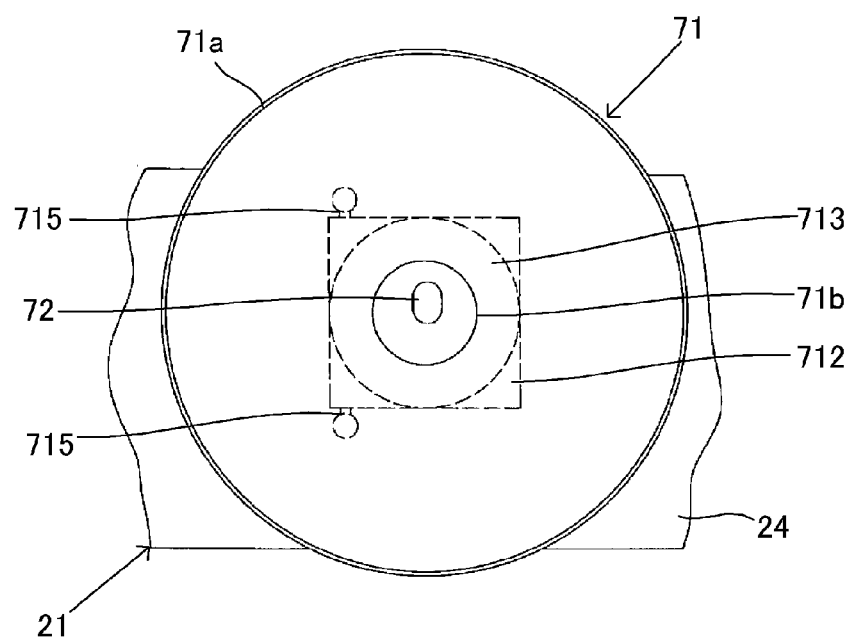
FIG. 7 is a plan view of a hopper.

The bottom member 712 is a thick-walled member which has a square shape in a plan view and is fixed to the flange 713 of the conical member 711, and is provided therein with a tapered communicating hole 714 which penetrates vertically and is tapered toward the lower side. Further, a lower end of the communicating hole 714 is formed as an elliptical lower opening 72 which is in the form of being eccentric with a center axis of the hopper 71, as shown in FIG. 7, and which communicates with a pump chamber 70a of the material feed pump 70 (see FIG. 8). This lower opening 72 serves as the lower opening in accordance with claim 2.

Figure 8:
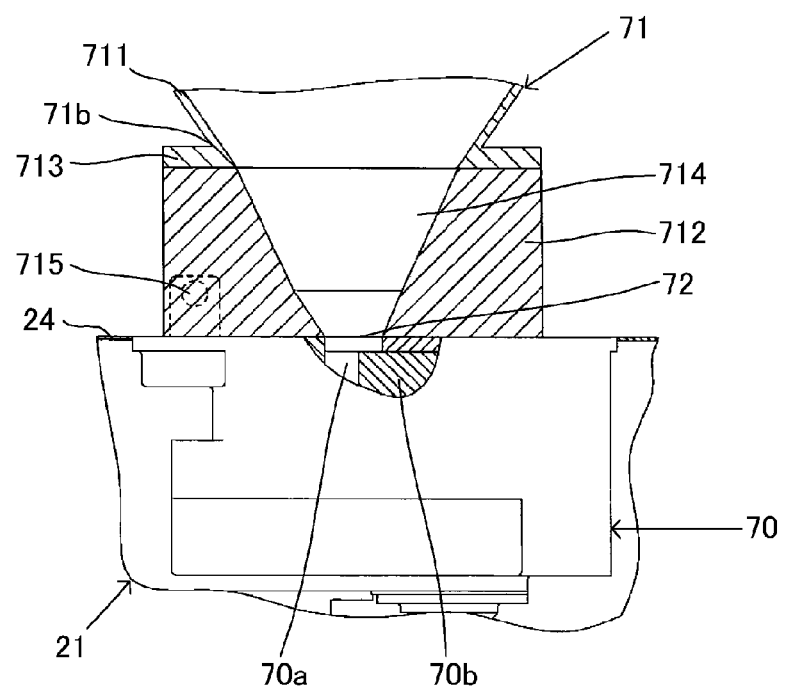
FIG. 8 is an enlarged fragmentary cross-sectional view of a lower portion of the hopper and a pump chamber.

The bottom member 712 of the hopper 71 is disposed in a state of being in contact with a pump upper portion 70d (see FIG. 9) of the material feed pump 70, and the lower opening 72 formed in the bottom member 712 is located on the material feed pump 70 (see FIG. 8). In the invention of this application, this positional relationship described just above is phrased in the present invention as "the lower opening is positioned at the upper surface of the main body case in a plan view (refer to claim 2)."

Figure 9:
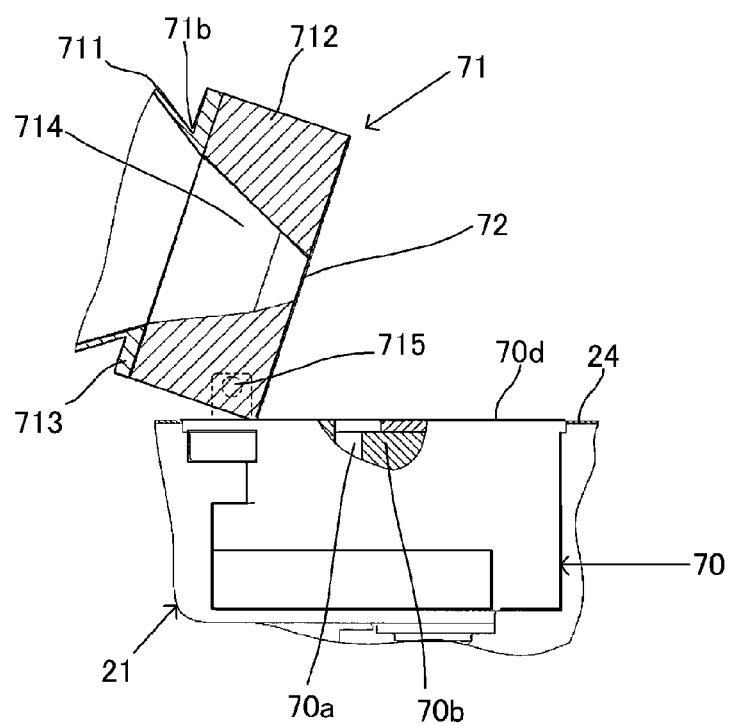
FIG. 9 is a diagram illustrating a state in which the hopper shown in FIG. 8 is tilted.

In addition, a shaft 715 is provided at a lower rearward side of the bottom member 712 to make the hopper 71 rotatable in the counterclockwise direction toward the rearward side, as shown in FIGS. 1 and 9.

Reference numeral 73 denotes a lift arm, and the lift arm 73 has an arm part 73a and a U-shaped placing part 73b. A meat wagon 74 containing the material such as meat is placed on the U-shaped placing part 73b, and the arm part 73a is rotated in the clockwise direction by an unillustrated hydraulic mechanism to charge the material into the hopper 71 from above the large-diameter end 71a.

Incidentally, since the pump chamber 70a becomes stained, the pump chamber 70a needs to be cleaned. For this reason, as shown in FIG. 9, the hopper 71 is capable of being tilted in the counterclockwise direction toward the placing part 73b side (rearward side) of the lift arm 73 by means of the shaft 715, so that if the hopper 71 is tilted, the pump chamber 70a becomes exposed. Thus, the pump chamber 70a and vanes 70b are cleaned.

As the form adopted is such that the hopper 71 is tilted toward the placing part 73b side of the lift arm 73 away from the main body case 21, the hopper 71 can be easily tiled without being hampered by the respective members of the stuffing apparatus 20, and the cleaning of the pump chamber 70a and the vanes 70b can be easily performed.

Figure 2:
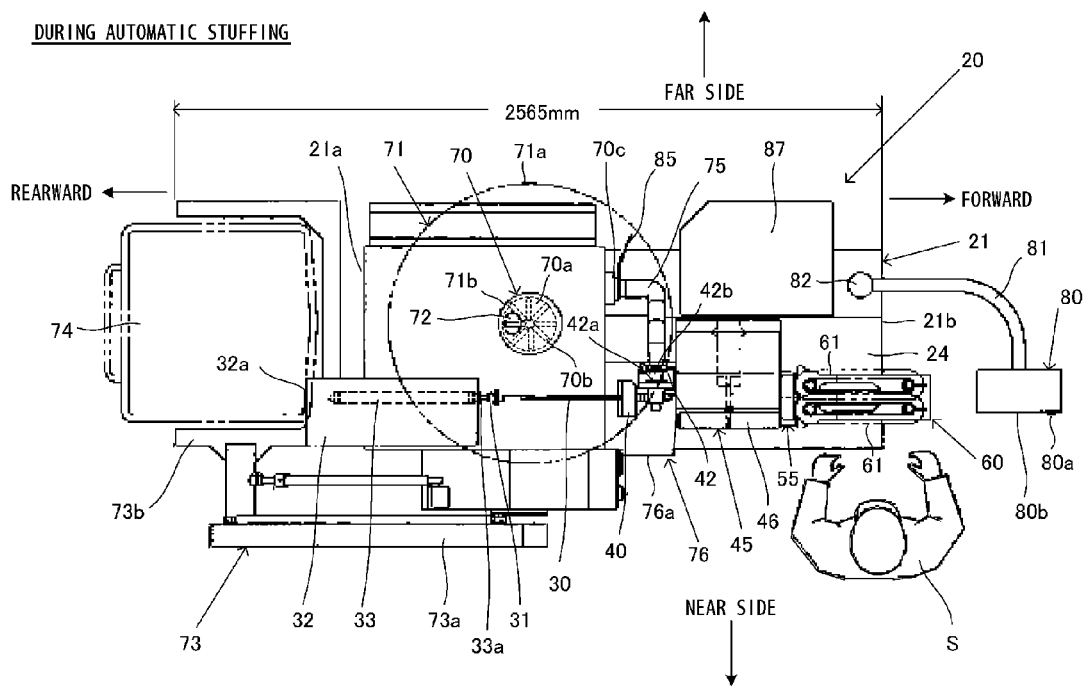
FIG. 2 is a plan view of the stuffing apparatus shown in FIG. 1 and illustrates the apparatus in operation during automatic stuffing.
Figure 14:
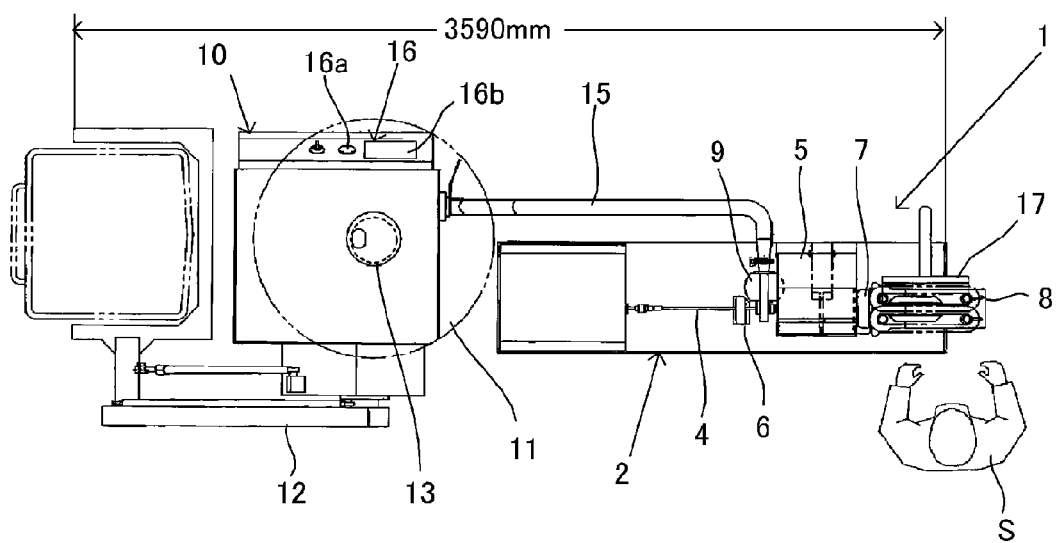
FIG. 14 is a plan view of the conventional stuffing apparatus.

In addition, by virtue of the form in which the lift arm 73 is provided on the side away from the pincher device 60 with the main body case 21 disposed therebetween, and the lift arm 73 is rotated clockwise in the direction toward the main body case 21, it is possible to minimize an increase in the longitudinal length of the stuffing apparatus 20 from a forward end 21b of the main body case 21 to a distal end of the arm part 73a. Note that in contrast to the length in the case of a conventional stuffing apparatus which is 3590 mm, as shown in FIG. 14, the length of the stuffing apparatus 20 in accordance with the invention of this application can be decreased to 2565 mm, as shown in FIG. 2.

The material feed pump 70, which feeds the material such as meat into the stuffing nozzle 30, is a vane pump which is provided immediately below the hopper 71 and has the pump chamber 70a and the plurality of vanes 70b. The pump chamber 70a extends in the horizontal direction, the shaft of the vanes 70b is vertical, and the vanes 70b extend radially from the shaft.

As described above, the lower opening 72 is communicated with the pump chamber 70a. For this reason, the material in the hopper 71 enters from the lower opening 72 into the pump chamber 70a and is sent out from the material feed port 70c (see FIGS. 2 and 10) of the pump chamber 70a into the material feed pipe 75. It should be noted that, in FIG. 2, the invisible portions of the plurality of vanes 70b are indicated by broken lines, and the visible portion disposed immediately below the lower opening 72 is indicated by solid lines.

The material feed pump 70, which is driven by the pump drive motor 28 constituted by a variable speed servo motor, feeds a predetermined amount of material into the stuffing nozzle 30.

The invention of this application is configured such that the material feed pump 70, the driving mechanism of the material feed pump 70, and the like are provided in the main body case 21 on which the stuffing nozzle 30 and the conveying device (pincher device 60) are provided, i.e., these members are integrally incorporated therein; more specifically, the lower opening 72 of the hopper 71 communicating with the pump chamber 70a is positioned at the upper surface 24 of the main body case 21; and still more specifically, that lower opening 72 is positioned on the forward side as practically as possible to thereby render the main body case 21 compact in size.

Namely, more specifically, it suffices if the lower opening 72 is positioned forwardly of the cylinder accommodating box 32 in a plan view, as shown in FIG. 2, or the lower opening 72 is positioned forwardly of the cylinder accommodating box 32 and on the farther side of the stuffing nozzle 30 (upper side in FIG. 2) in a plan view. To change the viewpoint, it suffices if the large-diameter end 71a of the hopper 71 is positioned forwardly of the rear end 21a of the main body case 21.

To change the viewpoint further, it suffices if the stuffing nozzle-use air cylinder 33 and the casing pushing-use air cylinder 34 are disposed within an area between the large-diameter end 71a and the bottom member 712 of the hopper 71 in a plan view, and the rotary joint 31, i.e., a coupling member for coupling together the stuffing nozzle 30 at the initial position and the cylinder rod 33a of the stuffing nozzle-use air cylinder 33, is positioned within the area of the large-diameter end 71a of the hopper 71 in a plan view, to thereby render the main body case 21 compact in size. The stuffing nozzle-use air cylinder 33 and the casing pushing-use air cylinder 34 may be substituted by known linear actuators which are driven by a servo motor.

The pump chamber 70a of the material feed pump 70 is communicated with the aforementioned vacuum pump 29 through a coupling pipe 29b and sets the pressure within the pump chamber 70a to a low level to facilitate the influx of the material. Incidentally, if the pump chamber 70a is evacuated by the vacuum pump 29, part of the material enters the coupling pipe 29b, so that a trap 76 for trapping that material is provided on that side surface of the main body case 21 which is on the side of the operating position of the operator S (see FIGS. 1 and 2).

Figure 11:
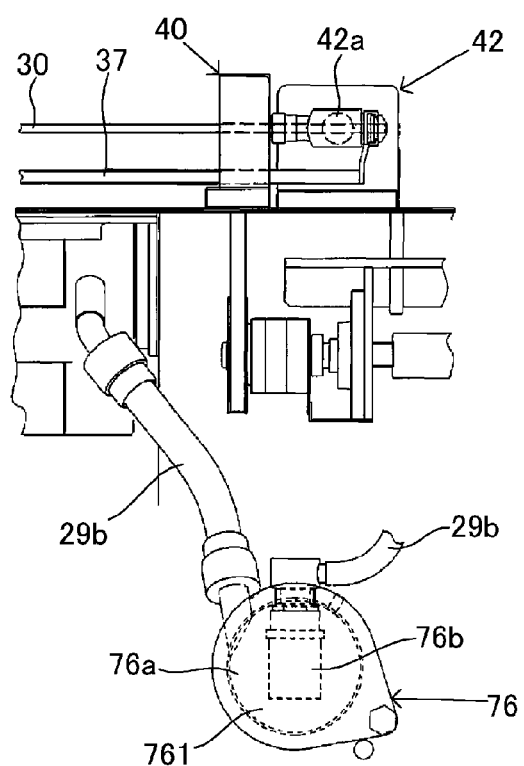
FIG. 11 is a front elevational view illustrating a trap and its vicinities.

This trap 76 has a vacuum chamber 761 in its interior, a mesh filter 76b (see FIG. 11) communicating with the vacuum pump 29 is provided in this vacuum chamber 761, and a lid for opening its material removal port is formed as a transparent window 76a (see FIG. 11). As shown in FIGS. 1 and 2, this trap 76 is disposed on the side surface of the main body case 21 in the vicinity of the operating position of the operator S. For this reason, the operator S is able to confirm, without moving, whether the material and the like have been trapped in the trap 76, and if so, is able to remove the material and the like accumulated in the vacuum chamber 761 after opening the transparent window 76a. It should be noted that a second trap 29c is provided on the downstream side of the trap 76 to ensure safety.

A display unit 80 is provided on the upper surface 24. This display unit 80 has various switches 80a and a display 80b, and if the operator S presses the switch 80a for starting, the stuffing apparatus 20 starts the stuffing operation.

The display unit 80 has a support column 81 which is bent while curving at a right angle and a rotating shaft 82 which is a lower end portion of the support column 81 and is erected on the upper surface 24. The rotation of the rotating shaft 82 allows the display 80b side of the display unit 80 to be changed between the operating position (position shown in FIG. 2) during the automatic stuffing operation and the operating position (position shown in FIG. 7) during the manual stuffing operation.

Further, as shown in FIG. 2, the rotating shaft 82 is provided at a position close to the forward end 21b of the upper surface 24 near the corner on the farther side where other members are not provided. Furthermore, the display unit 80 during the automatic stuffing operation is positioned forwardly of the forward end 21b of the main body case 21, as shown in FIG. 2. By virtue of such positioning, even if the operating position of the operator S during the manual stuffing operation is on the forward side, confirmation of the display unit 80 after being rotated is facilitated. In other words, a work table 87 can be disposed by being brought close to the forward side up to the vicinity of the rotating shaft 82, thereby making it possible to suppress an increase in the longitudinal length of the main body case 21.

This display unit 80 is provided with switches necessary for automatic stuffing and switches necessary for manual operation, so that the operator S is able to operate at respective operating positions without moving and is able to confirm the condition at the time of the operation by means of the display unit 80b, hence reducing the burn on the operator S.

A description will be given of the automatic stuffing of the stuffing apparatus 20. When the switch 80a for starting of the display unit 80 is pressed, the stuffing nozzle-use air cylinder 33 is actuated to move the discharge port 30a of the stuffing nozzle 30 to a position between the pincher device 60 and the braking mechanism 58, and during that movement the shirred casing 35 is loaded on the outer periphery of the stuffing nozzle 30 from the casing feeding device 45.

In addition, the casing pusher 37 is pushed by the casing pushing-use air cylinder 34, and the push member 37b of the casing pusher 37 pushes the rear end portion 35b of the shirred casing 35. Simultaneously, the material feed pump 70, the stuffing nozzle 30, and the braking mechanism 58 rotate.

Then, the material of a fixed amount is discharged continuously from the discharge port 30a toward the unshirred casing 35a of the shirred casing 35. When the material is discharged, the shirred casing 35 is pulled out forwardly from the braking mechanism 58 by the stuffing pressure, and moves toward the pincher device 60.

The pincher members 66 of the pincher device 60, while moving from the rearward toward the forward side of the discharge port 30a, are brought close to the outer periphery of the stuffing nozzle 30, and start to constrict the stuffed casing 36 at a position close to the discharge port 30a.

The pincher members 66, upon completion of the constriction of the stuffed casing 36 by continuing to move about the driving shafts 62, pull the stuffed casing 36 along the direction of the axis X (see FIG. 3) while maintaining the constricting state and convey it forwardly. When the stuffed casing 36 is pulled by the pincher members 66, the front end portion of the shirred casing 35 on the stuffing nozzle 30 is subjected to pressing action by the braking mechanism 58 and is pulled and stretched forwardly, and moves as the unshirred casing 35a. Thus, the shirred casing 35 is pulled and stretched beginning with its forward end.

The rear end portion 35b of the shirred casing 35 is pushed and moved forwardly by the portion of the length of the shirred casing 35 pulled and stretched by casing pusher 37.

Since the forward end portion of the shirred casing 35 is constantly pressed by the braking mechanism 58, the front end portion of the shirred casing 35 rotates together with the braking mechanism 58, so that a twist is continually imparted to each constricted portion of the stuffed casing 36.

The aforementioned twisting of the stuffed casing 36 is continued until the ensuing constriction by the ensuing pincher members 66 is completed. The pincher members 66 continue continuous movement at a fixed speed, and the material is continuously discharged into the unshirred casing 35a pulled out and stretched from the discharge port 30a by the action of the material feed pump 70, thereby forming the stuffed casing 36 continuously.

The above-described operation continues, and when all of the shirred casing 35 is pulled out and stretched, the controller stops the operation of the material feed pump 70 and the like to complete stuffing and causes the stuffing nozzle 30 and the casing pusher 37 return to their initial positions on the rearward side.

Next, a description will be given of manual stuffing. The work table 87 for manual operation is provided in the vicinity of the rotating shaft 82 on the upper surface 24. This work table 87 has a plate-like body of a substantially rectangular shape and is in the form in which it is disposed between the material feed pipe 75 and the rotating shaft 82 and on the far side of the casing feeding device 45, a part thereof jutting out toward the farther side. Namely, the position of the work table 87 is located in a place where members which are used during automatic stuffing are not disposed, the installation of the work table 87 is easy, and it is possible to reduce an increase in the size of the main body case 21.

First, the material feed pipe 75 is removed. The removal is effected by rotating a lever 85 on the material feed port 70c side to release the engagement of one end of the material feed pipe 75, and by loosening the clamp 42c on the nozzle supporting casing 42 side to release the engagement of the other end thereof. Thus, the material feed pipe 75 is detachable with respect to the material feed port 70c and the through hole 42b of the nozzle supporting casing 42 (see FIG. 10).

Next, a manual stuffing nozzle 86 is prepared. A root portion of the manual stuffing nozzle 86 is fitted to the material feed port 70c, and the lever 85 is rotated to fix it.

Figure 12:
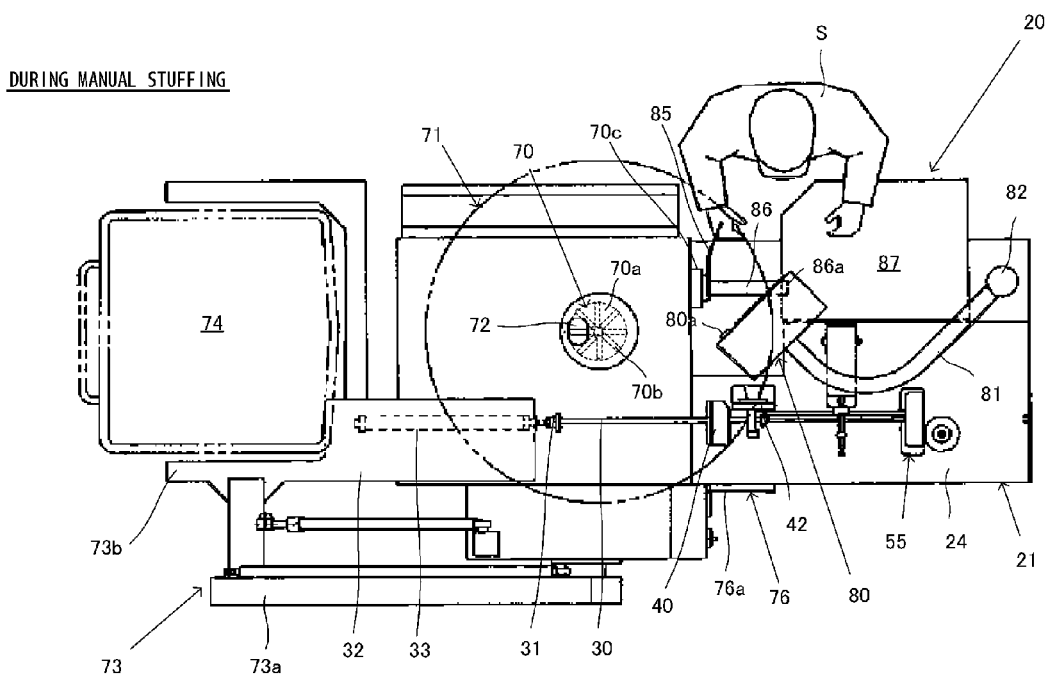
FIG. 12 is a plan view of the stuffing apparatus shown in FIG. 1 and illustrates the apparatus in operation during manual stuffing.

This having been done, the manual stuffing nozzle 86 is positioned in the longitudinal direction, and a discharge port 86a of its distal end is positioned above the work table 87 and overlaps the work table 87 in a plan view. Its state is shown in FIG. 12.

Then, the operator S is positioned in front of the work table 87 to perform the operation. The position of the operator S in this manual stuffing is on the opposite side to the side of automatic stuffing with the main body case 21 interposed therebetween. For this reason, the operator S is able to easily perform the manual operation without being hampered by the members used during automatic operation.

When the manual stuffing nozzle 86 is installed, the manual stuffing nozzle 86 becomes parallel with the stuffing nozzle 30 in a plan view. For this reason, it is possible to minimize an increase in the transverse length of the main body case 21.

When performing manual stuffing, the casing hopper 46 of the casing feeding device 45 is removed, and the display unit 80 is rotated so that the side of the display unit 80 having the switches 80a and the display 80b is brought to the operator S side. This state is shown in FIG. 12. The operator S loads the empty shirred casing 35 on the manual stuffing nozzle 86 and presses the start switch 80a.

Then, the material is extruded from the discharge port 86a, the operator S, while coiling the stuffed casing 36 on the work table 87, allows all one casing to be stuffed and stops the stuffing operation. The operator S removes the stuffed casing 36 from the work table 87. Subsequently, the stuffed casing 36 is twisted to a necessary link length by a separate device to form linked sausages of the necessary length. Namely, this stuffing apparatus 20 is of a hybrid type having automatic stuffing and manual stuffing functions.

The term "automatic stuffing" referred to in the invention of this application is construed to mean the stuffing of a material into a casing while the stuffed casing is being conveyed by a conveying device. Accordingly, even if the loading of the shirred casing on the stuffing nozzle and the pushing of the rear end portion of the shirred casing are done by the operator, insofar as the conveying device is used in stuffing, this type of stuffing also falls under the category of automatic stuffing.

As for the material feed pump in accordance with the invention of this application, the type of the pump is not limited insofar as the pump is provided below the hopper, communicates with the hopper, and is capable of transferring under pressure the sausage material stored in the hopper. For example, it is possible to use as the material feed pump a known vane pump (e.g., one disclosed in JP-A-1991-189391), a known gear pump (e.g., one disclosed in JP-A-1988-33206), and a known screw pump (e.g., one disclosed in U.S. Pat. No. 4,370,779).

It should be noted that the invention of this application is not limited to the above-described embodiment, and various modifications are possible without departing from the gist of the invention. For example, the invention of this application is also applicable to a stuffing apparatus in which the stuffing nozzle and/or the braking member is not rotated and a stuffing apparatus for sausage products having a straight shape. Still further, a natural intestine casing may be used as the shirred casing.

What is claimed is:

1. A stuffing apparatus comprising: a main body case, a stuffing nozzle having a discharge port for discharging a material, a material feed pump for feeding the material into said stuffing nozzle, a pump drive motor, and a conveying device for conveying a stuffed casing with the material stuffed therein in a direction in which the material discharged from the discharge port is discharged, wherein a hopper into which the material is charged from above is provided above said material feed pump, said material feed pump, said pump drive motor, and said hopper are provided on said main body case on which said stuffing nozzle and said conveying device are provided, and the material which is fed from said material feed pump is automatically stuffed by being fed into said stuffing nozzle via a material feed pipe.

2. The stuffing apparatus according to claim 1, wherein said hopper has a conical shape or a polygonal pyramid shape, a lower opening communicating with a pump chamber of said material feed pump is provided in a bottom member of said hopper, and the lower opening is positioned at an upper surface of said main body case in a plan view.

3. The stuffing apparatus according to claim 1, wherein said stuffing nozzle is coupled to a cylinder rod of a stuffing nozzle-use air cylinder via a coupling member, and in an initial position of said stuffing nozzle, the coupling member is positioned within an area of a large-diameter end of said hopper in a plan view.

4. The stuffing apparatus according to claim 1, further comprising: a vacuum pump for setting the pressure within the pump chamber of said material feed pump to a low level; and a trap provided in a coupling pipe for coupling the pump chamber and the vacuum pump to trap the material which is sucked, the trap being provided on a side surface, located on a side of an operator, of said main body case.

5. The stuffing apparatus according to claim 1, wherein said material feed pipe is detachable with respect to a material feed port of said material feed pump, and, during manual operation, manual stuffing is effected after removing said material feed pipe and mounting a manual stuffing nozzle to the material feed port.

6. The stuffing apparatus according to claim 5, wherein said stuffing nozzle and said manual stuffing nozzle are parallel with each other in a plan view.

7. The stuffing apparatus according to claim 5, wherein operating positions of the operator at the time of automatic stuffing using said stuffing nozzle and manual stuffing using said manual stuffing nozzle are on opposite sides with said main body case interposed therebetween.

8. The stuffing apparatus according to claim 1, further comprising: a display unit for displaying an operating condition, said display unit being rotatable on said main body case.

9. The stuffing apparatus according to claim 1, further comprising: a casing feeding device disposed at a position adjacent to, and on a forward side of, said material feed pipe to set a shirred casing in alignment with an axis of said stuffing nozzle.

10. The stuffing apparatus according to claim 1, wherein the main body case is formed into the shape of one case provided with the stuffing nozzle, the material feed pump, the pump drive motor and the conveying device.

* * * * *